United States Patent
Nagakura (10) Patent No.: US 9,219,377 B2
(45) Date of Patent: Dec. 22, 2015

(54) BATTERY CHARGING APPARATUS AND BATTERY CHARGING METHOD

(75) Inventor: Hayato Nagakura, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 380 days.

(21) Appl. No.: 13/701,282

(22) PCT Filed: Jun. 2, 2011

(86) PCT No.: PCT/JP2011/003128
§ 371 (c)(1),
(2), (4) Date: Nov. 30, 2012

(87) PCT Pub. No.: WO2011/152062
PCT Pub. Date: Dec. 8, 2011

(65) Prior Publication Data
US 2013/0069584 A1     Mar. 21, 2013

(30) Foreign Application Priority Data

Jun. 3, 2010 (JP) ................................. 2010-127479
Apr. 20, 2011 (JP) ................................. 2011-093939

(51) Int. Cl.
*H02J 7/00* (2006.01)
*H01M 10/44* (2006.01)
(Continued)

(52) U.S. Cl.
CPC ............. *H02J 7/0086* (2013.01); *H01M 10/44* (2013.01); *H01M 10/441* (2013.01); *H01M 10/443* (2013.01); *H01M 10/052* (2013.01);
(Continued)

(58) Field of Classification Search
CPC ....................................................... Y02E 60/12
USPC ........................................................ 320/107
See application file for complete search history.

(56) References Cited

U.S. PATENT DOCUMENTS 6,674,265 B2    1/2004   Yoshida et al.
7,948,212 B2    5/2011   Odaohhara
(Continued)

FOREIGN PATENT DOCUMENTS

JP    2001-186686 A    7/2001
JP    2002-359008 A    12/2002
(Continued)

OTHER PUBLICATIONS

Supplementary European Search Report dated Feb. 3, 2014 (6 pgs.).
(Continued)

*Primary Examiner* — Edward Tso
*Assistant Examiner* — Ahmed Omar
(74) *Attorney, Agent, or Firm* — Foley & Lardner LLP (57) ABSTRACT

A battery charging apparatus is configured to charge a battery with at least one of charging current and charging power set to a predetermined setpoint, wherein the battery includes a lithium secondary cell. The battery charging apparatus calculates a lithium deposition threshold voltage value based on the setpoint, wherein lithium is assumed to be deposited in the lithium secondary cell when a terminal voltage of the lithium secondary cell is above the lithium deposition threshold voltage value. Then, the battery charging apparatus compares the terminal voltage with the calculated lithium deposition threshold voltage value, and controls the at least one of charging current and charging power depending on the comparison.

10 Claims, 4 Drawing Sheets

(51) Int. Cl.
*H01M 10/052* (2010.01)
*H01M 10/48* (2006.01)

(52) U.S. Cl.
CPC ............ *H01M 10/48* (2013.01); *H01M 10/482* (2013.01); *H01M 2220/20* (2013.01); *Y02T 10/7011* (2013.01)

(56) References Cited

U.S. PATENT DOCUMENTS

2009/0104510 A1   4/2009   Fulop et al.
2010/0007310 A1   1/2010   Kawamoto et al.
2010/0102778 A1   4/2010   Otsu et al.

FOREIGN PATENT DOCUMENTS

| | | |
|---|---|---|
| JP | 2003-79059 A | 3/2003 |
| JP | 2006-246645 A | 9/2006 |
| JP | 2007-57433 A | 3/2007 |
| JP | 2009-55729 A | 3/2009 |
| JP | 2010-40499 A | 2/2010 |
| WO | WO 2008/102528 A1 | 8/2008 |
| WO | WO2008/154956 A1 * | 12/2008 ............ H01M 10/44 |
| WO | WO 2008/154956 A1 | 12/2008 |

OTHER PUBLICATIONS

Japanese Office Action, Mar. 17, 2015, 3 pages.

\* cited by examiner

BATTERY CHARGING APPARATUS AND BATTERY CHARGING METHOD

TECHNICAL FIELD

The present invention relates to battery charging apparatus and battery charging method.

BACKGROUND ART

Japanese Patent Application Publication 2003-079059 discloses a method for charging an assembled battery that is composed of a plurality of lithium secondary cells, such as lithium-ion cells, which are connected to each other. In this method, the current terminal voltage of each lithium secondary cell is compared with a specific full-charge voltage value. When the terminal voltage of at least one of the lithium secondary cells has reached the full-charge voltage value, the charging current starts to be gradually reduced so that other cells can be gradually charged to fully-charged state while the terminal voltage of the fully-charged cell is maintained at the full-charge voltage value.

SUMMARY OF INVENTION

According to the method described above, even when the terminal voltage of a cell is below the full-charge voltage value, deposition of lithium (i.e. deposition of lithium dendrite on a negative electrode plate) may occur in the cell depending on the magnitude of the charging current or charging power. This may adversely affect the performance of the battery.

In view of the foregoing, it is desirable to provide a battery charging apparatus and a battery charging method with which deposition of lithium in a cell of a battery can be suitably prevented.

According to one aspect of the present invention, a battery charging apparatus for charging a battery including a lithium secondary cell, the battery charging apparatus comprising: a charging section configured to charge the lithium secondary cell with at least one of charging current and charging power manipulated; a current measuring section configured to obtain a measured value of a charging current applied to the lithium secondary cell; a voltage measuring section configured to obtain a measured value of a terminal voltage of the lithium secondary cell; and a control section configured to repeat a process during charging of the lithium secondary cell, wherein the process includes: calculating a lithium deposition threshold voltage value based on the measured value of the charging current, wherein lithium is assumed to be deposited in the lithium secondary cell when the terminal voltage is above the lithium deposition threshold voltage value; comparing the measured value of the terminal voltage with the calculated lithium deposition threshold voltage value; and controlling the at least one of charging current and charging power depending on the comparison.

According to another aspect of the present invention, a battery charging method for charging a battery with at least one of charging current and charging power manipulated, wherein the battery includes a lithium secondary cell, the battery charging method comprising repeating a process during charging of the lithium secondary cell, wherein the process includes: calculating a lithium deposition threshold voltage value based on a measured value of a charging current applied to the lithium secondary cell, wherein lithium is assumed to be deposited in the lithium secondary cell when a terminal voltage of the lithium secondary cell is above the lithium deposition threshold voltage value; comparing the terminal voltage with the calculated lithium deposition threshold voltage value; and controlling the at least one of charging current and charging power depending on the comparison.

DESCRIPTION OF EMBODIMENTS

Figure 1:
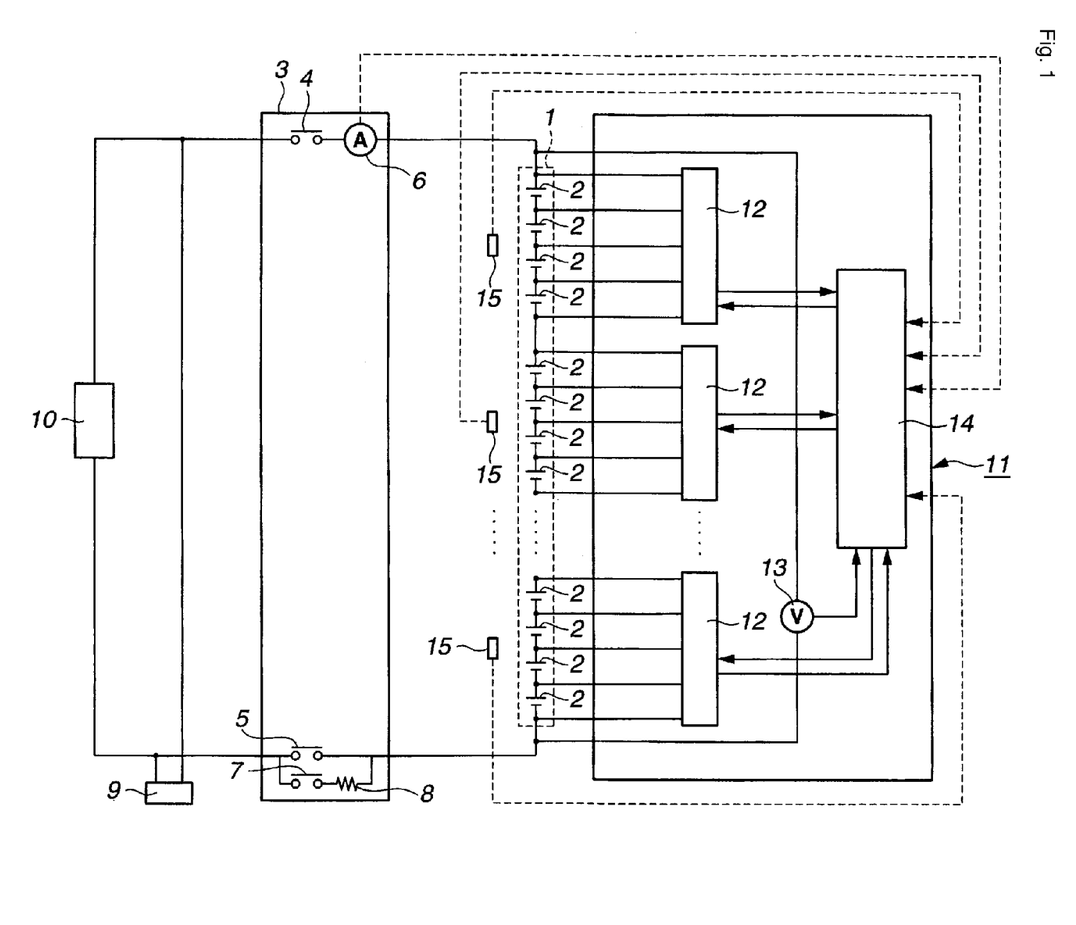
FIG. 1 is a diagram showing configuration of a battery system according to an embodiment of the present invention.

FIG. 1 shows configuration of a battery system according to an embodiment of the present invention. This battery system is configured as a power supply for an electric vehicle or hybrid electric vehicle. The battery system is not so limited, but may be applied to another system.

As shown in FIG. 1, the battery system includes an assembled battery 1. Assembled battery 1 is composed of a plurality of cells 2 which are connected to each other in series. Assembled battery 1 is connected to a charger 9 and a vehicle load 10 through a junction box 3. Junction box 3 houses main relays 4, 5, wherein main relay 4 connects one end of assembled battery 1 to a line leading to charger 9 and vehicle load 10, and main relay 5 connects another end of assembled battery 1 to another line leading to charger 9 and vehicle load 10. Vehicle load 10 includes a starter motor, a driving motor, etc. Junction box 3 is provided with a current sensor 6, a precharge relay 7, and a resistance 8 as well as main relays 4, 5. Current sensor 6 is configured to measure a charge and discharge current with which assembled battery 1 is charged or discharged. Precharge relay 7 and resistance 8 are connected to each other in series, and connected in parallel with main relay 5. Current sensor 6 sends to a microcomputer 14 a signal indicative of information about the measured charge and discharge current.

On the other hand, a battery controller 11 is composed of cell controllers IC (cell controller integrated circuit) 12, a total voltage sensor 13, and microcomputer 14. Cell controllers IC 12 are configured to measure the terminal voltage of each cell 2, and monitors whether or not each cell 2 is applied with excessive charge or excessive discharge. Total voltage sensor 13 is configured to measure a total terminal voltage of assembled battery 1. Microcomputer 14 includes a ROM (read only memory) for memorizing programs and data for controlling the assembled battery 1, and a RAM (Random Access Memory) for temporarily memorizing data during calculation.

As shown in FIG. 1, each cell controller IC 12 is connected to four cells 2 as a unit, for measuring the terminal voltage of four cells 2 and monitoring excessive charge or excessive discharge of four cells 2. Cell controller IC 12 sends to microcomputer 14 a signal indicative of obtained information about four cells 2.

As shown in FIG. 1, a plurality of temperature sensors 15 are provided for measuring the temperature of cells 2. Each temperature sensor 15 sends to microcomputer 14 a signal indicative of information about the measured temperature. In this example, each temperature sensor 15 is provided per four cells 2. This configuration may be modified so that each temperature sensor 15 is provided per two cells 2.

Microcomputer 14 receives information about charge and discharge current I of assembled battery 1 obtained by current sensor 6, cell voltage $V_{cell}$ of each cell 2 obtained by cell controller IC 12, total voltage V of assembled battery 1 obtained by total voltage sensor 13, and cell temperature T of each cell 2 obtained by temperature sensor 15.

Battery controller 11 makes microcomputer 14 perform calculations based on charge and discharge current I, cell voltage $V_{cell}$, total voltage V and cell temperature T, and control charging operation of assembled battery 1 based on the calculations. The following describes a battery charging method of controlling the charging operation of assembled battery 1 with reference to FIG. 2.

Figure 2:
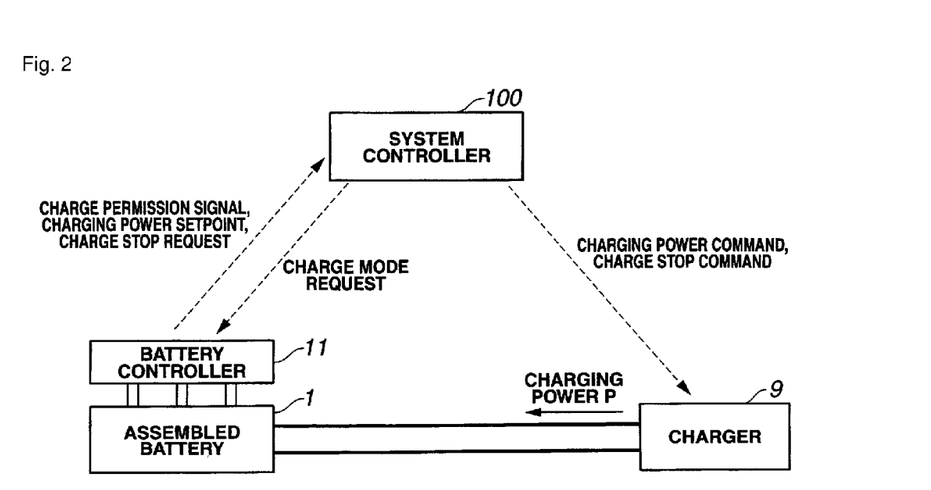
FIG. 2 is a diagram showing a control system of the battery system according to the embodiment.

FIG. 2 shows a control system of the battery system according to the embodiment, focusing on configuration of a system controller 100, battery controller 11 and charger 9, wherein other components are omitted. In this control system, system controller 100 is a high-level controller for controlling the battery controller 11 and charger 9.

System controller 100 is configured to start to charge assembled battery 1, in response to a condition that the vehicle on which the battery system is mounted is connected to an external charger or the like. Specifically, system controller 100 determines whether to start the charge mode, shifts a vehicle system from normal mode to charge mode by sending charge mode requests to battery controller 11 and some of other controllers that are mounted on the vehicle and used for charging operation.

Upon receipt of the charge mode request from system controller 100, battery controller 11 makes microcomputer 14 determine whether or not assembled battery 1 is fully charged. In response to determination that assembled battery 1 is not fully charged, microcomputer 14 calculates charging power P with which assembled battery 1 is to be charged. The method of calculating the charging power P is described in detail below. Battery controller 11 sends to system controller 100 a signal indicative of charging power P calculated by microcomputer 14, and a charge permission signal indicative of permission to charge assembled battery 1.

Upon receipt of the charge permission signal and the signal of charging power P from battery controller 11, system controller 100 sends a charging power command signal to charger 9 based on the charge permission signal and charging power P from battery controller 11. In response to this charging power command signal, charger 9 starts to supply charging power to assembled battery 1 with charging power P calculated by microcomputer 14.

On the other hand, after the charging operation for assembled battery 1 is started, battery controller 11 repeatedly determines by microcomputer 14 whether or not assembled battery 1 is fully charged. In response to determination that assembled battery 1 is fully charged, battery controller 11 sends a charge stop request to system controller 100. Upon receipt of the charge stop request, system controller 100 sends a charge stop command signal to charger 9 so that the charging operation of charger 9 for assembled battery 1 is terminated.

The following describes how microcomputer 14 determines charging power P.

Figure 3:
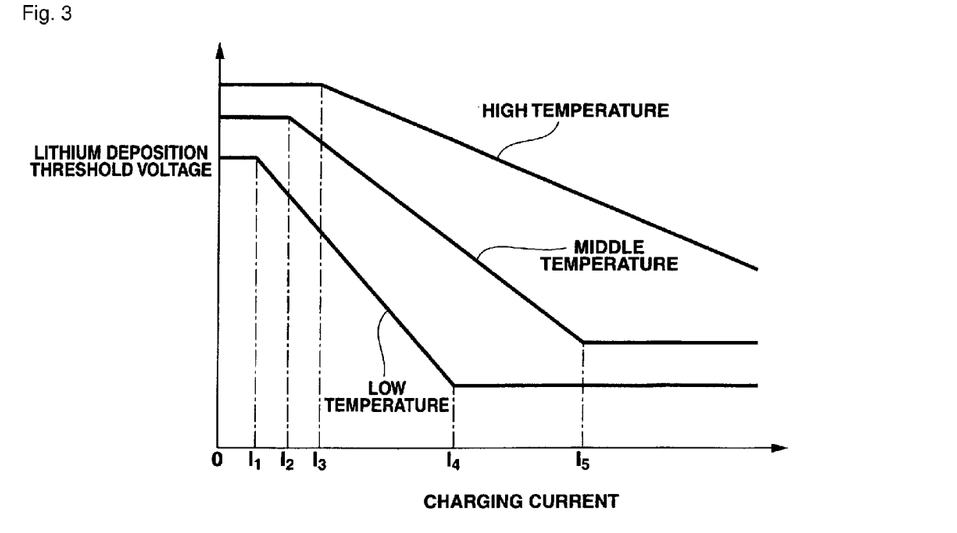
FIG. 3 is a graphic diagram showing a relationship between a charging current and a lithium deposition threshold voltage value.

FIG. 3 shows a relationship between a charging current and a lithium deposition threshold voltage value $V_{dep}$, wherein deposition of lithium (deposition of lithium dendrite on the negative electrode plate) occurs inside the lithium secondary cell when the terminal voltage of a lithium secondary cell is below the lithium deposition threshold voltage value. In FIG. 3, three curves represent a relationship under low temperature condition, a relationship under middle temperature condition, a relationship under high temperature condition.

As shown in FIG. 3, under the high temperature condition, when charging current I is above zero and below a value $I_3$, the lithium deposition threshold voltage value $V_{dep}$ is constant. When charging current I is above the value $I_3$, the lithium deposition threshold voltage value $V_{dep}$ tends to decrease as the charging current I increases. The lithium deposition threshold voltage value $V_{dep}$ has a similar tendency under other conditions, namely, under the low temperature condition, and under the middle temperature condition. Specifically, under the middle temperature condition, when charging current I is above zero and below a value $I_2$, the lithium deposition threshold voltage value $V_{dep}$ is constant. When charging current I is above the value $I_2$ and below a value $I_5$, the lithium deposition threshold voltage value $V_{dep}$ tends to decrease as the charging current I increases. Under the low temperature condition, when charging current I is above zero and below a value $I_1$, the lithium deposition threshold voltage value $V_{dep}$ is constant. When charging current I is above the value $I_1$ and below a value $I_4$, the lithium deposition threshold voltage value $V_{dep}$ tends to decrease as the charging current I increases.

In this way, a lithium secondary cell has a tendency that lithium deposition threshold voltage value $V_{dep}$ decreases as a charging current increases, wherein the tendency varies according to temperature condition. If the lithium secondary cell is charged with a relatively large charging current or charging power, the terminal voltage of the lithium secondary cell may rise so that deposition of lithium begins even when the terminal voltage of the lithium secondary cell is relatively low. In this viewpoint, it is preferable to maintain the charging current or charging power relatively small, in order to allow the terminal voltage of the lithium secondary cell to be raised as high as possible while preventing the deposition of lithium.

The relationship between the charging current and the lithium deposition threshold voltage value $V_{dep}$ depends on the material and structure of the lithium secondary cell, and can therefore be calculated beforehand.

The problem about deposition of lithium described above is solved by the present embodiment in which a plurality of tables (charging-current-vs.-lithium-deposition-threshold-voltage tables, or I-$V_{dep}$ tables) are calculated beforehand for different temperatures, each of which tables represents a relationship between the charging current and the lithium deposition threshold voltage value $V_{dep}$, and memorized in the RAM of microcomputer 14 of battery controller 11, and referred to for determining the charging power P with which assembled battery 1 is charged.

Specifically, microcomputer 14 of battery controller 11 receives the information about cell temperature T from temperature sensor 15, and reads out one of the I-$V_{dep}$ tables which corresponds to cell temperature T. Then, microcomputer 14 calculates lithium deposition threshold voltage value $V_{dep}$ based on charge and discharge current I measured by current sensor 6, using the read table, and sets charging power P such that cell voltage $V_{cell}$ of each cell 2 is maintained below lithium deposition threshold voltage value $V_{dep}$ ($V_{cell}$<$V_{dep}$).

The I-$V_{dep}$ tables may be prepared taking account of a further parameter as well as the material and structure of the lithium secondary cell. For example, this parameter may be at least one of an error in measurement of cell voltage $V_{cell}$ of each cell 2 by cell controller IC 12; a delay in the measurement; and a ripple current caused by the charging operation for the cell. This modification serves to enhance the accuracy of calculation of lithium deposition threshold voltage value $V_{dep}$ so that deposition of lithium in cell 2 can be prevented effectively.

The cell temperature T, which is referred to for reading out one of the I-$V_{dep}$ tables, may be an average of the temperatures measured by temperature sensors 15. Alternatively, cell temperature T may be the highest one or lowest one among the temperatures measured by temperature sensors 15.

Figure 4:
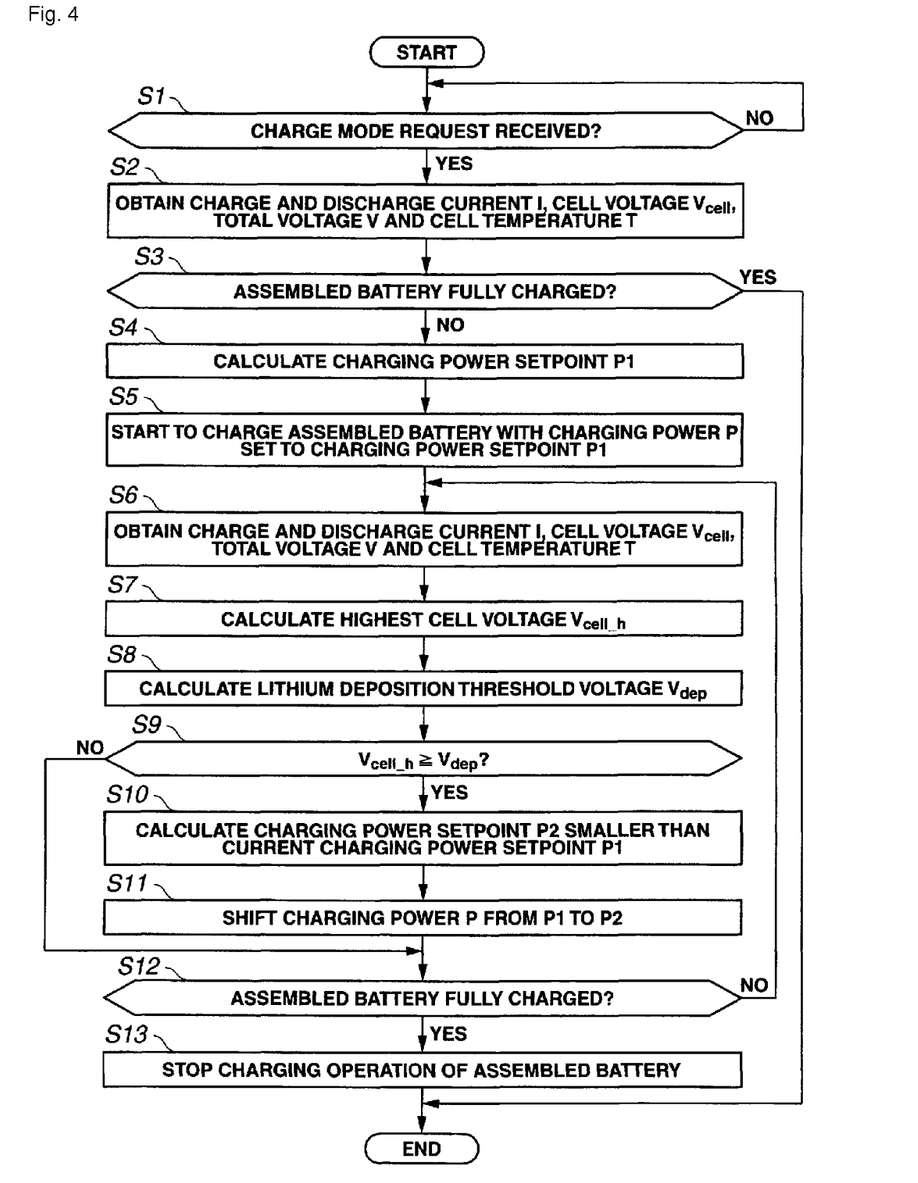
FIG. 4 is a flow chart showing a process of charging a battery according to the embodiment.

FIG. 4 is a flow chart showing a process of charging the assembled battery 1. This process is started when a vehicle system is shifted by system controller 100 from normal mode, in which assembled battery 1 is not charged by charger 9, to charge mode.

At Step S1, microcomputer 14 of battery controller 11 determines whether or not the charge mode request is received from system controller 100. When the answer to Step S1 is affirmative (YES), then microcomputer 14 proceeds to Step S2. On the other hand, when the answer to Step S1 is negative (NO), microcomputer 14 performs the operation of Step S1 repeatedly.

At Step S2, microcomputer 14 obtains the charge and discharge current I from current sensor 6, the cell voltage $V_{cell}$ from cell controllers IC 12, the total voltage V of assembled battery 1 from total voltage sensor 13, and the cell temperature T from temperature sensors 15.

At Step S3, microcomputer 14 determines whether or not assembled battery 1 is fully charged. This determination is implemented by checking the total voltage V obtained at Step S2, and determining that assembled battery 1 is fully charged when the total voltage V is equal to a specific full charge voltage value. When the answer to Step S3 is YES, microcomputer 14 returns from this process without further charging operation. On the other hand, when the answer to Step S3 is NO, microcomputer 14 proceeds to Step S4.

At Step S4, microcomputer 14 calculates a charging power setpoint $P_1$ of charging power P with which assembled battery 1 is charged, in response to the charge mode request from system controller 100. This calculation is implemented by calculation based on cell voltage $V_{cell}$ and cell temperature T using the I-$V_{dep}$ tables stored in the RAM. Specifically, microcomputer 14 reads out the table prepared for cell temperature T, and determines the charging power P based on cell voltage $V_{cell}$ using the selected table. This serves to prevent the cell voltage $V_{cell}$ from quickly reaching the lithium deposition threshold voltage value $V_{dep}$ by application of charging power P.

At Step S5, microcomputer 14 sends to system controller 100 the signal of charging power setpoint $P_1$ of charging power P calculated at Step S4, and the charge permission signal. In response to these signals, system controller 100 sends a charge command signal to charger 9 such that charger 9 charges assembled battery 1 with charging power P set to charging power setpoint $P_1$. In this way, charger 9 starts to charge assembled battery 1 with charging power P set to charging power setpoint $P_1$.

At Step S6, microcomputer 14 obtains the charge and discharge current I from current sensor 6, the cell voltage $V_{cell}$ from cell controllers IC 12, the total voltage V of assembled battery 1 from total voltage sensor 13, and the cell temperature T from temperature sensors 15.

At Step S7, microcomputer 14 calculates a highest cell voltage $V_{cell\_h}$ based on cell voltage $V_{cell}$ of each cell 2 obtained at Step S6. Highest cell voltage $V_{cell\_h}$ is the highest one of the terminal voltages of all cells 2 in assembled battery 1.

At Step S8, microcomputer 14 reads out the I-$V_{dep}$ table prepared for cell temperature T, and calculates the lithium deposition threshold voltage value $V_{dep}$ based on charging current I using the I-$V_{dep}$ table.

At Step S9, microcomputer 14 compares highest cell voltage $V_{cell\_h}$ with lithium deposition threshold voltage value $V_{dep}$. When highest cell voltage $V_{cell\_h}$ is lower than lithium deposition threshold voltage value $V_{dep}$ ($V_{cell\_h}<V_{dep}$), then microcomputer 14 proceeds to Step S12. On the other hand, when highest cell voltage $V_{cell\_h}$ is higher than or equal to lithium deposition threshold voltage value $V_{dep}$ ($V_{cell\_h}\geq V_{dep}$), then microcomputer 14 proceeds to Step S10.

At Step S10, microcomputer 14 shifts the charging power P from current charging power setpoint $P_1$ to a second charging power setpoint $P_2$ in order to prevent deposition of lithium in cell 2, wherein second charging power setpoint $P_2$ is smaller than current charging power setpoint $P_1$. Second charging power setpoint $P_2$ is calculated based on cell voltage $V_{cell}$ and cell temperature T obtained at Step S6, using the I-$V_{dep}$ tables stored in the RAM. Specifically, microcomputer 14 reads out the I-$V_{dep}$ table corresponding to cell temperature T, and determines second charging power setpoint $P_2$ of charging power P based on cell voltage $V_{cell}$, using the read I-$V_{dep}$ table. This allows to suitably control the amount of reduction in the voltage of assembled battery 1 with charging power P set to second charging power setpoint $P_2$.

Cell voltage $V_{cell}$ of each cell 2 is lower than or equal to highest cell voltage $V_{cell\_h}$. Accordingly, the operations of Steps S9 and S10 serve to maintain highest cell voltage $V_{cell\_h}$ below lithium deposition threshold voltage value $V_{dep}$, and thereby maintain cell voltage $V_{cell}$ of each and every cell 2 below lithium deposition threshold voltage value $V_{dep}$. This serves to effectively prevent the deposition of lithium in each cell 2.

At Step S11, microcomputer 14 sends to system controller 100 the signal of second charging power setpoint $P_2$ of charging power P calculated at Step S10. In response to this signal, system controller 100 sends a charging command signal to charger 9 such that charger 9 charges assembled battery 1 with charging power P set to second charging power setpoint $P_2$. In this way, charger 9 starts to charge assembled battery 1 with charging power P shifted from first charging power setpoint $P_1$ to second charging power setpoint $P_2$.

At Step S12, microcomputer 14 determines whether or not assembled battery 1 is fully charged. This determination is implemented by checking the charge and discharge current I and total voltage V obtained at Step S6, and determining that assembled battery 1 is fully charged when the total voltage V obtained at Step S6 is equal to the specific full charge voltage value, and charge and discharge current I is below a predetermined threshold value. When the answer to Step S12 is YES, microcomputer 14 proceeds to Step S13. On the other hand, when the answer to Step S12 is NO, microcomputer 14 returns to Step S6, and repeatedly performs the operations of Steps S6 to S12.

At Step S13, microcomputer 14 stops charging operation in response to determination at Step S12 that assembled battery 1 is fully charged. Specifically, microcomputer 14 sends a charge stop request signal to system controller 100. In response to this charge stop request signal, system controller 100 sends a charge stop request signal to charger 9. In response to this charge stop request signal, charger 9 terminates supply of charging power P to assembled battery 1.

Figure 5:
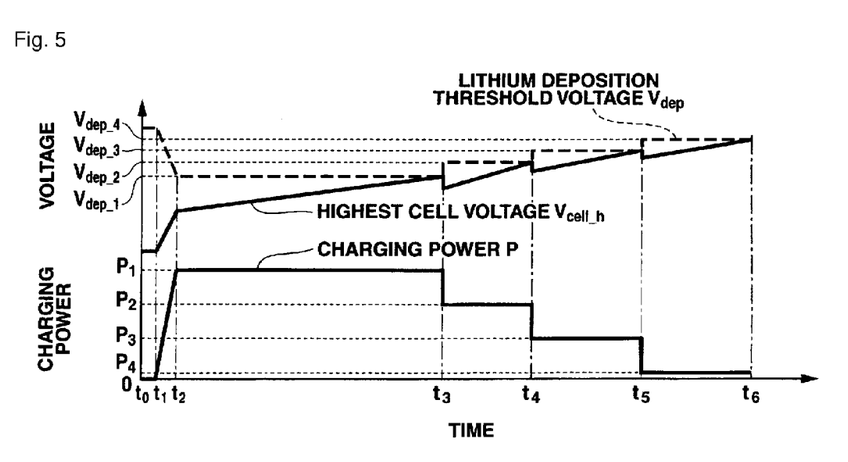
FIG. 5 is a time chart showing an example of how each cell is charged by the battery charging apparatus battery charging method according to the embodiment.

FIG. 5 shows an example of how cell 2 is charged by the battery charging method according to the present embodiment. In FIG. 5, three solid or broken curves represent changes of charging power P, highest cell voltage $V_{cell\_h}$ and lithium deposition threshold voltage value $V_{dep}$ during a period of time instant $t_0$ to time instant $t_6$.

During a period of time instant $t_0$ to time instant $t_1$, no charge mode request is issued by system controller 100 (NO at Step S1). Accordingly, charging power P is equal to zero so that assembled battery 1 is not being charged.

At time instant $t_1$, system controller 100 issues the charge mode request (YES at Step S1), and then microcomputer 14 obtains charge and discharge current I, cell voltage V cell of each cell 2, total voltage V of assembled battery 1, and cell temperature T (at Step S2). Then, it is determined whether or not assembled battery 1 is fully charged (at Step S3), and charging power P is calculated based on cell voltage $V_{cell}$ and cell temperature T, using the I-$V_{dep}$ tables memorized in the RAM (at Step S4). In the situation of FIG. 5, charging power P is calculated to be equal to first charging power setpoint $P_1$ at time instant $t_1$ (at Step S4). Then, charger 9 starts to charge assembled battery 1 (at Step S5). At time instant $t_2$, charging power P reaches first charging power setpoint $P_1$.

During a period of time instant $t_2$ to time instant $t_3$, microcomputer 14 obtains charge and discharge current I, cell voltage $V_{cell}$ of each cell 2, total voltage V of assembled battery 1, and cell temperature T (at Step S6), and calculates highest cell voltage $V_{cell\_h}$ (at Step S7), and calculates lithium deposition threshold voltage value $V_{dep}$ (at Step S8), and determines whether or not relationship of highest cell voltage $V_{cell\_h}$ lithium deposition threshold voltage value $V_{dep}$ is true (at Step S9). In the situation of FIG. 5, during the period from time instant $t_2$ to time instant $t_3$ until immediately before time instant $t_3$, lithium deposition threshold voltage $V_{dep}$ is calculated to be equal to a lithium deposition threshold voltage value $V_{dep\_1}$ (at Step S8), and it is not determined that relationship of highest cell voltage $V_{cell\_h} \geq$ lithium deposition threshold voltage value $V_{dep\_1}$ is true (at Step S9). Accordingly, during this period, assembled battery 1 is charged with charging power P set to first charging power setpoint $P_1$, and highest cell voltage $V_{cell\_h}$ gradually increases as the charging operation progresses.

At time instant $t_3$, highest cell voltage $V_{cell\_h}$ becomes equal to lithium deposition threshold voltage value $V_{dep\_1}$ so that relationship of cell voltage $V_{cell} \geq$ lithium deposition threshold voltage value $V_{dep}$ is true (YES at Step S9), and second charging power setpoint $P_2$ is calculated which is smaller than first charging power setpoint $P_1$ (at Step S10), and assembled battery 1 is charged with charging power P shifted to second charging power setpoint $P_2$ (at Step S11). As a result, highest cell voltage $V_{cell\_h}$ deceases by an amount corresponding to an amount of change of charging power P.

During a period of time instant $t_3$ to time instant $t_4$, assembled battery 1 is charged similarly as during the period of time instant $t_2$ to time instant $t_3$, except that charging power P is set to second charging power setpoint $P_2$ and lithium deposition threshold voltage $V_{dep}$ is set to lithium deposition threshold voltage value $V_{dep\_2}$. Accordingly, during this period until immediately before time instant $t_4$, assembled battery 1 is charged with charging power P set to second charging power setpoint $P_2$, and highest cell voltage $V_{cell\_h}$ gradually increases as the charging operation progresses. At time instant $t_4$, highest cell voltage $V_{cell\_h}$ becomes equal to lithium deposition threshold voltage value $V_{dep\_2}$ so that relationship of cell voltage $V_{cell} \geq$ lithium deposition threshold voltage value $V_{dep}$ is true (YES at Step S9), and a third charging power setpoint $P_3$ is calculated which is smaller than current charging power setpoint $P_2$ (at Step S10), and assembled battery 1 is charged with charging power P shifted to third charging power setpoint $P_3$ (at Step S11). As a result, highest cell voltage $V_{cell\_h}$ deceases by an amount corresponding to an amount of change of charging power P.

During a period of time instant $t_4$ to time instant $t_5$, assembled battery 1 is charged similarly as during the period of time instant $t_2$ to time instant $t_3$, except that charging power P is set to third charging power setpoint $P_3$ and lithium deposition threshold voltage $V_{dep}$ is set to lithium deposition threshold voltage value $V_{dep\_3}$. Accordingly, during this period until immediately before time instant $t_5$, assembled battery 1 is charged with charging power P set to third charging power setpoint $P_3$, and highest cell voltage $V_{cell\_h}$ gradually increases as the charging operation progresses. At time instant $t_5$, highest cell voltage $V_{cell\_h}$ becomes equal to lithium deposition threshold voltage value $V_{dep\_3}$ so that relationship of cell voltage $V_{cell} \geq$ lithium deposition threshold voltage value $V_{dep}$ is true (YES at Step S9), and a fourth charging power setpoint $P_4$ is calculated which is smaller than current charging power setpoint $P_3$ (at Step S10), and assembled battery 1 is charged with charging power P shifted to fourth charging power setpoint $P_4$ (at Step S11). As a result, highest cell voltage $V_{cell\_h}$ deceases by an amount corresponding to an amount of change of charging power P.

During a period of time instant $t_5$ to time instant $t_6$, assembled battery 1 is charged similarly as during the period of time instant $t_2$ to time instant $t_3$, except that charging power P is set to fourth charging power setpoint $P_4$ and lithium deposition threshold voltage $V_{dep}$ is set to lithium deposition threshold voltage value $V_{dep\_4}$. Accordingly, during this period until immediately before time instant $t_6$, assembled battery 1 is charged with charging power P set to fourth charging power setpoint $P_4$, and highest cell voltage $V_{cell\_h}$ gradually increases as the charging operation progresses.

In the way described above with reference to the situation of FIG. 5, assembled battery 1 is charged into a fully charged state by charging with charging power P that is gradually reduced. This results in that lithium deposition threshold voltage value $V_{dep}$ rises as charging power P decreases, which serves to charge assembled battery 1 safely and effectively, while effectively preventing the occurrence of deposition of lithium in cell 2.

According to the present embodiment, lithium deposition threshold voltage value $V_{dep}$ is calculated by selecting one of the charging-current-vs.-lithium-deposition-threshold-voltage tables corresponding to cell temperature T, based on cell temperature T measured by temperature sensor 15, and using the selected table for calculating lithium deposition threshold voltage value $V_{dep}$ based on charge and discharge current I. Then lithium deposition threshold voltage value $V_{dep}$ is compared with highest cell voltage $V_{cell\_h}$ that is the highest one of the voltages of cells 2. When it is determined by the comparison that highest cell voltage $V_{cell\_h}$ is greater than or equal to lithium deposition threshold voltage value $V_{dep}$ ($V_{cell\_h} \geq V_{dep}$), charging power P with which assembled battery 1 is to be charged is shifted current charging power setpoint $P_1$ to a smaller charging power setpoint. This serves to charge assembled battery 1 safely and effectively, while effectively preventing the occurrence of deposition of lithium in cell 2.

Moreover, according to the present embodiment, the feature that charging power P is set by referring to one of the charging-current-vs.-lithium-deposition-threshold-voltage tables defined for different temperatures, serves to charge assembled battery 1 safely and effectively, while effectively preventing the occurrence of deposition of lithium in cell 2, and thereby shorten the period needed to fully charge assembled battery 1.

In the battery charging apparatus according to the present embodiment, microcomputer 14 serves as a control section and a memorizing section, charger 9 serves as a charging section, cell controller IC 12 serves as a voltage measuring section, and temperature sensor 15 serves as a temperature measuring section.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims. For example, the present embodiment may be modified as follows.

In the present embodiment, microcomputer 14 is configured to calculate and manipulate charging power P for controlling cell voltage $V_{cell}$, but microcomputer 14 may be alternatively or additionally configured to calculate and manipulate charging current I for controlling cell voltage $V_{cell}$. In such cases, a plurality of charging-current-vs.-lithium-deposition-threshold-voltage tables defining a relationship between charging current I and lithium deposition threshold voltage value $V_{dep}$ are memorized in the RAM, and referred to for calculation of charging current I.

In the present embodiment, charging power P is shifted when it is determined that highest cell voltage $V_{cell\_h}$ is higher than or equal to lithium deposition threshold voltage value $V_{dep}$ ($V_{cell\_h} \geq V_{dep}$), but this may be modified so that charging power P is shifted when highest cell voltage $V_{cell\_h}$ is within a predetermined range (for example, a value from a few millivolts to several tens of millivolts) from lithium deposition threshold voltage value $V_{dep}$.

In the present embodiment, system controller 100 has a function of determining whether or not to start the charge mode, for example, in response to that the host vehicle is connected to an external charging system, but this may be modified so that charger 9 is configured to implement this determination.

The invention claimed is:

1. A battery charging apparatus for charging a battery including a lithium secondary cell, the battery charging apparatus comprising:
    a charging section configured to charge the lithium secondary cell with at least one of charging current and charging power manipulated;
    a current measuring section configured to obtain a measured value of a charging current applied to the lithium secondary cell;
    a voltage measuring section configured to obtain a measured value of a terminal voltage of the lithium secondary cell;
    a temperature measuring section configured to obtain a measured value of temperature of the lithium secondary cell; and
    a control section configured to repeat a process during charging of the lithium secondary cell, wherein the process includes:
        calculating a lithium deposition threshold voltage value based on the measured value of the charging current, such that lithium may be deposited in the lithium secondary cell when the terminal voltage is above the lithium deposition threshold voltage value;
        comparing the measured value of the terminal voltage with the calculated lithium deposition threshold voltage value; and
        controlling the at least one of charging current and charging power based on a result of the comparison,
    wherein the control section is configured to calculate the lithium deposition threshold voltage value such that the calculated lithium deposition threshold voltage value decreases as the measured value of the charging current increases and as the measured value of temperature decreases.

2. The battery charging apparatus as claimed in claim 1, further comprising a memorizing section configured to memorize a set of tables each defining a relationship between the lithium deposition threshold voltage value and the at least one of charging current and charging power when the temperature is equal to a predetermined set value,
    wherein the control section is configured to calculate the lithium deposition threshold voltage value using the set of tables.

3. The battery charging apparatus as claimed in claim 2, wherein each table defines the relationship based on at least one of an error in the measured value of the terminal voltage; a delay time in the measurement of the terminal voltage; and a ripple current caused by the charging of the lithium secondary cell.

4. The battery charging apparatus as claimed in claim 1, wherein the control section is configured to shift the at least one of charging current and charging power from a first setpoint to a second setpoint when it is determined that the measured value of the terminal voltage has reached the lithium deposition threshold voltage value, and make the charging section charge the lithium secondary cell with the at least one of charging current and charging power set to the second setpoint.

5. The battery charging apparatus as claimed in claim 2, wherein the control section is configured to shift the at least one of charging current and charging power from a first setpoint to a second setpoint when it is determined that the measured value of the terminal voltage has reached the lithium deposition threshold voltage value, and make the charging section charge the lithium secondary cell with the at least one of charging current and charging power set to the second setpoint.

6. The battery charging apparatus as claimed in claim 5, wherein the control section is configured to set the at least one of charging current and charging power to the first setpoint using the set of tables before the charging of the lithium secondary cell is started.

7. The battery charging apparatus as claimed in claim 5, wherein the control section is configured to set the at least one of charging current and charging power to the second setpoint using the set of tables.

8. The battery charging apparatus as claimed in claim 1, wherein the control section is configured to implement the comparison by determining whether or not the measured value of the terminal voltage has reached the calculated lithium deposition threshold voltage value.

9. The battery charging apparatus as claimed in claim 1, comprising a plurality of the lithium secondary cells,
    wherein the control section is configured to implement the comparison by determining whether or not the measured value of a terminal voltage of one of the lithium secondary cells has reached the lithium deposition threshold voltage value,
    wherein the one of the lithium secondary cells has the highest in the measured value of the terminal voltage among all of the lithium secondary cells.

10. A battery charging method for charging a battery with at least one of charging current and charging power manipu lated, wherein the battery includes a lithium secondary cell, the battery charging method comprising:
  repeating a process during charging of the lithium secondary cell, wherein the process includes:
    calculating a lithium deposition threshold voltage value based on a measured value of a charging current applied to the lithium secondary cell, such that lithium may be deposited in the lithium secondary cell when a terminal voltage of the lithium secondary cell is above the lithium deposition threshold voltage value;
    comparing a measured value of the terminal voltage with the calculated lithium deposition threshold voltage value; and
    controlling the at least one of charging current and charging power based on a result of the comparison,
  wherein the calculating of the lithium deposition threshold voltage value includes:
    calculating the lithium deposition threshold voltage value such that the calculated lithium deposition threshold voltage value decreases as the measured value of the charging current increases and as a measured value of temperature decreases.

* * * * *